Aug. 22, 1944.  W. B. CONNOLLY ET AL  2,356,652

LIQUID LEVEL GAUGE

Filed March 1, 1943

William B. Connolly
George E. Ford
INVENTORS

BY Harold E. Stonebraker
ATTORNEY.

Patented Aug. 22, 1944

2,356,652

UNITED STATES PATENT OFFICE 2,356,652

LIQUID LEVEL GAUGE

William B. Connolly and George E. Ford, Rochester, N. Y., assignors to Rochester Manufacturing Co., Inc., Rochester, N. Y., a corporation of New York Application March 1, 1943, Serial No. 477,537

2 Claims. (Cl. 200—84)

This invention relates to improvements in liquid level gauges, with more particular reference to the type of instrument employing an oscillatory float-operated shaft carrying a surrounding circular magnet located on one side of an imperforate wall of a housing and operating a magnet and indicator in a dial case on the opposite side of said wall, and it has for its principal object to afford in conjunction with such a liquid level indicator practical and efficient means for giving a signal or alarm when the liquid in the chamber or tank reaches an excessively low or an excessively high level.

The invention is especially useful in connection with oil insulated electrical transformers with which difficulties have been experienced due to the oil draining from the tank when the latter has been damaged, as by shooting a hole in its wall, or to an overload, either of which conditions may cause the transformer to overheat, burn out, and incapacitate the power plant, and it is a specific purpose of the invention to afford the usual indication for informing an operator as to the amount and level of liquid within the tank, and at the same time give a warning signal, either by means of a suitable light, bell, or other alarm, in the event that the level of oil in the transformer tank either falls or rises to a dangerous point, so that the operator is instantly advised of the condition and can take steps to correct it.

A further purpose of the invention is to afford mechanism that depends upon a magnetic operation of a switch operating device for controlling the signal circuit and that is so constructed as to insure an instantaneous and positive operation of the switch.

Still another object of the invention is to afford a structure that lends itself readily to giving a signal for either an excessively low or an excessively high liquid level and in which the switch control mechanism can quickly be assembled in operative relationship to the liquid level gauge without requiring any substantial changes and without affecting the functioning or appearance of the latter.

An additional purpose of the invention is to afford switch control mechanism that is of simple and economical construction, compactly arranged, and securely housed and protected when in service.

To these and other ends, the invention consists in the construction and arrangement of parts that will appear clearly from the following description when read in conjunction with the accompanying drawing, the novel features being pointed out in the claims following the specification.

Figure 1:
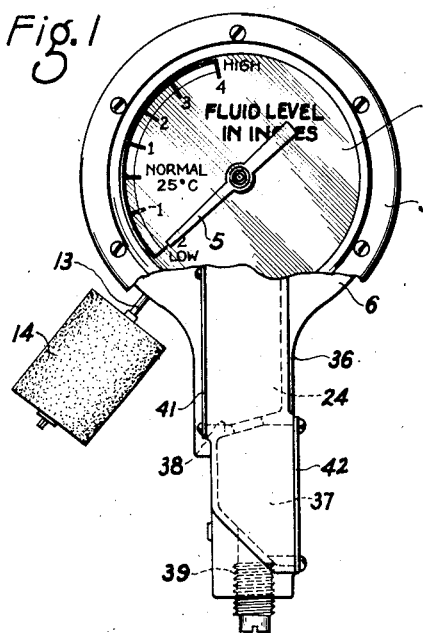
Fig. 1 is a front elevation of a liquid level gauge showing the application of a preferred embodiment of the invention.
Figure 2:
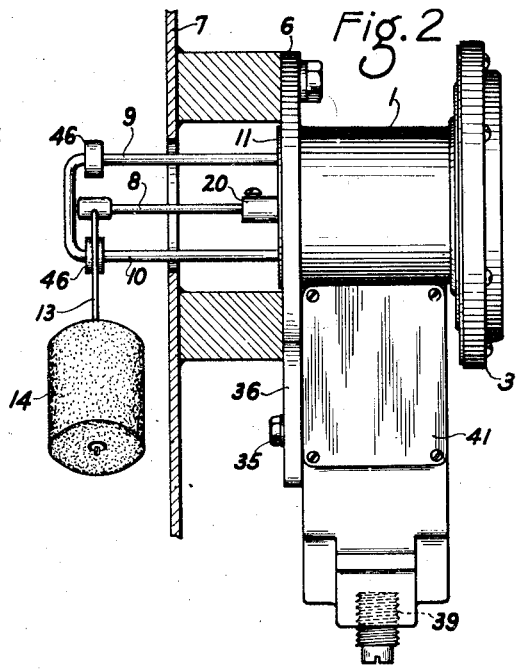
Fig. 2 is a side elevation partially in section.
Figure 3:
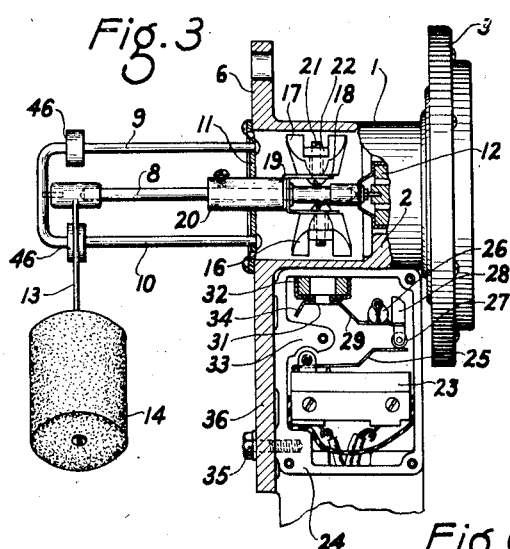
Fig. 3 is a vertical sectional view taken centrally of Fig. 1, and showing the switch operating lever in position for closing the signal circuit.
Figure 4:
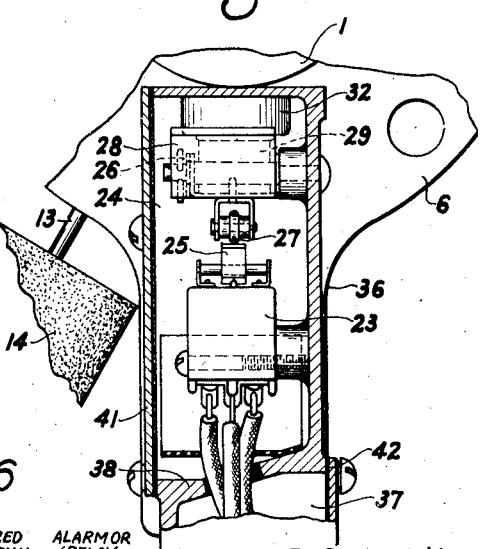
Fig. 4 is a vertical sectional view taken transversely of Fig. 3.
Figure 5:
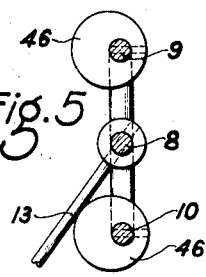
Fig. 5 is a detail sectional view through the support for the float-operated shaft.
Figure 6:
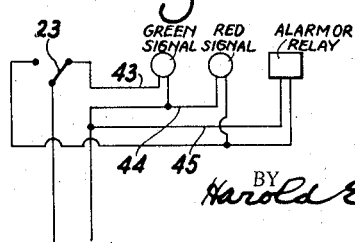
Fig. 6 is a diagrammatic view of the electric signal controlling circuit.

Referring more particularly to the drawing in which like reference numerals throughout the several views refer to the same parts, I designates a housing, preferably of cylindrical form, that is closed at its front end to afford an imperforate wall 2 to which is secured the dial case 3 within which is the dial 4 and indicator or pointer 5, while at its rear end the housing I is provided with a flange 6 by which it is attached to the wall 7 of the tank or container of the transformer or other unit containing the oil or liquid with which the instrument is intended to function.

Arranged within the housing I is an oscillatory shaft 8 mounted in bearings at the front of the housing and at the rear of a supporting frame including top and bottom rods 9 and 10 respectively and carried by a plate 11 that is attached at the rear of the housing. The shaft 8 carries at its front end a circular magnet 12 that operates a magnet within the dial case 4 and to which the indicator 5 is connected, while at its rear end the shaft 8 carries a float rod 13 extending laterally from the shaft and provided at its outer end with the float 14 that rests upon the liquid in the tank and controls the position of the shaft 8 and indicator 5 to show at any given instant the level of oil.

It is desirable in conjunction with this type of instrument to give a visual or audible alarm when the level of liquid reaches either an excessively low or high point without interfering with the normal operation of the level indicator and without requiring substantial changes in the mechanism. To accomplish this, there is provided a signal circuit including switch mechanism mounted in proximity to the aforesaid housing, the switch operating means including a magnet that is arranged in proximity to the path of movement of a magnet on the float-operated shaft 8 and arranged to be actuated thereby when the shaft has rotated to a predetermined point in either direction depending upon the level of liquid in the tank.

This is preferably accomplished by a pair of magnets 16 and 17 secured to the shaft 8 at opposite points on the side thereof, each of said magnets being mounted upon an arm 18 of a bracket 19 secured to a sleeve 20 that is mounted on the shaft 8, each magnet being secured to its arm 18 by means of a bolt 21 and nut 22.

The magnets 16 and 17 may be of a generally horseshoe form and are disposed on the shaft 8 in such positions that when the level of liquid reaches the predetermined excessively low or high point, the magnet 16, for the low point, and magnet 17, for the high point, will come into the zone of the housing nearest to the switch mechanism now to be described and into the field of a magnet located beneath the housing and carried by a switch operating device.

To accomplish this, there is provided a switch designated generally at 23 mounted within a switch box 24 that will be described more fully presently, while 25 designates an actuator for the switch which is preferably a single-pole double-throw type of snap switch. The switch actuator 25 is controlled by a switch operating device or lever that is pivoted on a stud 26 and is provided at one end adjacent to its pivotal point and on its underside with an anti-friction roller 27 that engages the switch actuator 25 to move the latter.

28 is a counterbalance or weight located above the roller 27 and secured to the upper surface of the operating lever, which includes an upwardly inclined central portion 29 terminating in a horizontal end 31 to which is attached a circular magnet 32 which is pulled upwardly by one or the other of the magnets on the shaft 8 when it reaches the dangerously high or low level position. This forces the roller 27 downwardly and laterally in a quick wiping action across the switch actuator 25, thus closing switch 23, the weight of the counterbalance 28 being such as to insure an instantaneous positive action of the actuating lever when the magnet 32 is drawn upwardly. The operating lever is returned to initial position by the weight of the magnet 32 which carries the end 31 downwardly, and such downward movement of the actuating lever is limited by a stop 33 formed on the switch box 24 and arranged to engage the lug 34 on the actuating lever. The operating lever remains in this position normally when the level of liquid in the tank is within proper limits.

The switch box 24 is suitably attached by means of a bolt 35 to an extension 36 formed on the flange 6 and is located with its upper end against the housing 1 and between the flange 6 and the dial case 3 at the front of the housing. The switch box includes an upper compartment for the switch mechanism already described and a lower compartment 37 separated therefrom by a horizontal wall 38, the conductors passing to the switch through the wall 38 which is suitably sealed to prevent access of moisture or condensation within the switch chamber. The conductors may be connected to wiring extending through a conduit that is secured within the threaded opening 39 at the bottom of the switch box. The switch mechanism chamber is open on one side to permit access to the mechanism through a removable cover plate 41 while the lower compartment is open on the opposite side to permit access through the removable cover plate 42 for connecting the wires when installing the instrument.

The switch 23 is preferably of the single-pole double-throw type, normally closing a circuit through conductor 43 to a green signal lamp or other suitable indicator of normal safe conditions, and when actuated by the magnet already described upon the liquid level falling or rising to an excessively low or high point, the switch is operated to close the circuit to a danger or red signal lamp through conductor 44, or to a suitable alarm or relay through conductor 45. The signals may be located at any point in the power house remote from the transformer and as long as the proper level of oil is maintained in the transformer chamber, the green signal lamp is lighted, but if the level of oil falls or rises to a dangerous point, the red lamp is lighted or other signal given, and in event that a conductor is broken or the signal mechanism fails for any reason to function, no signal appears and the operator is thus advised of trouble.

It is desirable to provide for adjustment of the upward and downward limits of movement of the float rod in order properly to correlate the positions at which a signal is given with the normal range of movement of the float rod when the proper level of oil is maintained in the tank, and in order to accomplish this the rods 9 and 10 of the support in which the shaft 8 is journalled are provided with circular stop members 46 which are eccentrically adjustable on the rods 9 and 10 and held in any desired position of adjustment by suitable pins extending through the stop members and engaging the shafts 9 and 10. By turning the stop members 46 on their shafts and securing them in any desired adjusted positions, the range of movement of the float rod can be controlled and its upward and downward limits of movement thus fixed in proper relation to the normal movement of the float rod and indicator 5 over the scale 4.

It will be understood that only one magnet may be used on the float-rod shaft if it is preferred to give a signal only in case of a low level of liquid in the tank, and while the invention has been described with reference to the particular construction shown, it is not confined to the mechanical details herein disclosed and this application is intended to cover such modifications as may come within the purposes of the improvement and the scope of the following claims.

We claim:

1. In a liquid level gauge of the type including a housing, an oscillatory float-operated shaft located within the housing, and a signal operating magnet extending radially from said shaft and movable bodily therewith, the combination with a signal operating switch located outside the housing and a switch actuator, of a pivoted operating lever movable independently of and controlling said switch actuator, said operating lever being located beneath said signal operating magnet, a roller carried by the end of the operating lever adjacent to its pivotal point and located for engagement with the switch actuator, a counterbalance carried by said lever and located above said roller, and a magnet at the other end of said operating lever located in proximity to the path of movement of the signal operating magnet, the weight of the lever and magnet operating to move the lever downwardly when released by the signal operating magnet.

2. In a liquid level gauge of the type including a housing, an oscillatory float-operated shaft located within the housing, and a signal operating magnet extending radially from said shaft and movable bodily therewith, the combination with a signal operating switch located outside the housing and a switch actuator, of a pivoted operating lever movable independently of and controlling said switch actuator, said operating lever being located beneath said signal operating magnet and engaging the switch actuator adjacent to the pivotal point of said lever, and a magnet at the other end of said operating lever located in proximity to the path of movement of the signal operating magnet, the weight of the lever and magnet operating to move the lever downwardly when released by the signal operating magnet.

WILLIAM B. CONNOLLY.
GEORGE E. FORD.